US012260435B2

(12) United States Patent
Yoshida

(10) Patent No.: US 12,260,435 B2
(45) Date of Patent: Mar. 25, 2025

(54) PRICE MANAGEMENT SYSTEM, PRICE MANAGEMENT METHOD, AND RECORDING MEDIUM

(71) Applicant: NEC Corporation, Tokyo (JP)

(72) Inventor: Daishi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/268,944

(22) PCT Filed: Mar. 24, 2021

(86) PCT No.: PCT/JP2021/012133
§ 371 (c)(1),
(2) Date: Jun. 21, 2023

(87) PCT Pub. No.: WO2022/201339
PCT Pub. Date: Sep. 29, 2022

(65) Prior Publication Data
US 2024/0054536 A1   Feb. 15, 2024

(51) Int. Cl.
G06Q 30/0283 (2023.01)
(52) U.S. Cl.
CPC .................. G06Q 30/0283 (2013.01)
(58) Field of Classification Search
CPC .................................... G06Q 30/0283
USPC ........................................... 705/400
See application file for complete search history.

(56) References Cited

U.S. PATENT DOCUMENTS

| 2011/0276430 | A1* | 11/2011 | Vyas | G06Q 30/0633 |
| | | | | 705/26.8 |
| 2013/0110601 | A1 | 5/2013 | Sugiura et al. | |
| 2015/0262269 | A1* | 9/2015 | Zamer | H04W 4/02 |
| | | | | 705/26.1 |
| 2016/0343050 | A1* | 11/2016 | D'Souza | G06Q 30/0605 |
| 2017/0372285 | A1* | 12/2017 | Cho | G06Q 30/0217 |
| 2018/0198865 | A1* | 7/2018 | Kurihara | G08G 1/095 |
| 2019/0294807 | A1 | 9/2019 | Takano | |
| 2020/0090200 | A1* | 3/2020 | Ichimura | G06Q 10/087 |
| 2020/0104565 | A1* | 4/2020 | Zucker | G06Q 30/00 |

FOREIGN PATENT DOCUMENTS

| EP | 3540677 A1 * | 9/2019 | ............. G06Q 30/02 |
| JP | 2000-048259 A | 2/2000 | |
| JP | 2002-163437 A | 6/2002 | |
| JP | 2013097765 A * | 5/2013 | |

(Continued)

OTHER PUBLICATIONS

"Automatic Tailoring of the Retail Experience to the Customers Present," Jul. 9, 2012, IP.com PAD, https://priorart.ip.com/IPCOM/000219721. pp. 2-5. (Year: 2012).*

(Continued)

Primary Examiner — Jeff Zimmerman
Assistant Examiner — Hunter A Molnar

(57) ABSTRACT

A price management system according to an aspect of the present disclosure includes: at least one memory configured to store instructions; and at least one processor configured to execute the instructions to: extract a phrase related to evaluation of a price of a product or a service that is an evaluation target from a voice of a customer collected in a store; and send a notification of detection of price evaluation when the phrase is extracted.

15 Claims, 16 Drawing Sheets

(56) References Cited

FOREIGN PATENT DOCUMENTS

| JP | 2014-002774 A | 1/2014 |
|---|---|---|
| JP | 2014-052678 A | 3/2014 |
| JP | 2019-168810 A | 10/2019 |
| JP | 2020-106906 A | 7/2020 |
| JP | 2020-109709 A | 7/2020 |

OTHER PUBLICATIONS

International Search Report for PCT Application No. PCT/JP2021/012133, mailed on Apr. 27, 2021.
English translation of Written opinion for PCT Application No. PCT/JP2021/012133, mailed on Apr. 27, 2021.
Sawaya, Kenji, Series 18 Contribute to the community with O2O, Mapion's social games, Monthly Boss July Issue, Jul. 1, 2013, pp. 94 to 96.

* cited by examiner

Fig.3

PRICE IS EVALUATED.

SPEECH CONTENT:
DATE AND TIME: 2021/3/31, 14:46
POSITION: MICROPHONE No. 2, IN FRONT OF PRODUCT A
RECOGNIZED TEXT: "THIS IS A LITTLE EXPENSIVE."

Fig.8

```
PRICE IS COMPARED WITH THAT OF OTHER
STORES.

SPEECH CONTENT:
DATE AND TIME: 2021/3/31, 14:46
POSITION:
MICROPHONE No. 2, IN FRONT OF PRODUCT A
RECOGNIZED TEXT: "THIS WAS MORE
EXPENSIVE WHEN SEEN AT OTHER STORES."
```

Fig.9

| COMPARED STORE | PHRASE SPECIFYING COMPARED STORE |
|---|---|
| DRUG STORE Y | Y-DRUG, Y (ABBREVIATION), NEIGHBORING STORE |
| SUPERMARKET Z | Z-MARKET, Z, SUPERMARKET OVER THERE, STORE IN FRONT OF STATION |
| OTHERS | OVER THERE, ANOTHER STORE |
| DRUG STORE X | HERE, X-DRUG |

Fig.10

PRICE IS COMPARED WITH THAT OF DRUG STORE Y.
PRICE AT DRUG STORE Y SEEMS TO BE CHEAPER.

SPEECH CONTENT:
DATE AND TIME:2021/3/31,　14:46
RECOGNIZED TEXT: "IT WAS 3500 YEN AT Y-DRUG."

Fig.13

PRICE OF PRODUCT A IS COMPARED WITH THAT OF OTHER STORES. PRICE IS CHANGED TO 3500 YEN.

BASIS OF DETERMINATION:
SET PRICE BEFORE CHANGE: 3999 YEN
PRICE AT OTHER STORES: NOT CLEAR (CHEAPER)
LOWER-LIMIT PRICE: 3500 YEN

PRICE MANAGEMENT SYSTEM, PRICE MANAGEMENT METHOD, AND RECORDING MEDIUM

This application is a National Stage Entry of PCT/JP2021/012133 filed on Mar. 24, 2021, the contents of all of which are incorporated herein by reference, in their entirety.

TECHNICAL FIELD

The present disclosure relates to a price management system and the like.

BACKGROUND ART

Depending on the store, the same product or a service may be offered at different prices. Then, the customer may compare the price of the store with the price of another store and determine whether to purchase the product or the service at the store. Therefore, an employee of a store may go to a competing store to grasp the price, and determine the price of the product according to the price of the product.

As a technique related to the present disclosure, PTL 1 discloses a price comparison support system including a server and a communication terminal. In PTL 1, the communication terminal transmits price negotiation information including a voice and an image including a price of a negotiation result at a sales store to the server. The server stores the price negotiation information. The user of the communication terminal uses the price negotiation information of the product sent by the server in response to the inquiry request of the product price for price negotiation in the store.

CITATION LIST

Patent Literature

PTL 1: JP 2013-097765 A

SUMMARY OF INVENTION

Technical Problem

It is cumbersome for store employees to go to a competing store to grasp a customer's evaluation on a store's price. In addition, it is costly to frequently go to the competing store to grasp whether the price of the competing store is changing.

In PTL 1, unless the user inputs a voice and an image to the communication terminal, the server cannot acquire information on the price of the product. In addition, the technique according to PTL 1 can be used only when a price is negotiated in a store.

An object of the present disclosure is to provide a price management system and the like that can easily collect evaluations on a price of a product or a service by a customer.

Solution to Problem

A price management system according to the present disclosure includes an extraction means that extracts a phrase related to evaluation of a price of a product or a service which is an evaluation target from a voice of a customer collected in a store, and a notification means that sends a notification of detection of price evaluation when the phrase is extracted.

A price management method according to the present disclosure includes extracting a phrase related to evaluation of a price of a product or a service which is an evaluation target from a voice of a customer collected in a store, and sending a notification of detection of price evaluation when the phrase is extracted.

A recording medium according to the present disclosure non-transitorily records a program for causing a computer to execute a process of extracting a phrase related to evaluation of a price of a product or a service which is an evaluation target from a voice of a customer collected in a store, and a process of sending a notification of detection of price evaluation when the phrase is extracted.

Advantageous Effects of Invention

According to the present disclosure, it is possible to easily collect the evaluations on the price of the product or the service by the customer.

BRIEF DESCRIPTION OF DRAWINGS

FIG. 3 is a diagram illustrating an example of notification according to the first example embodiment.

FIG. 8 is a diagram illustrating an example of notification according to a third example embodiment.

FIG. 9 is a diagram illustrating an example of a store name database.

FIG. 10 is a diagram illustrating another example of notification.

FIG. 13 is a diagram illustrating an example of a price change notification.

EXAMPLE EMBODIMENT

First Example Embodiment

In the first example embodiment, a price management system 100 that sends a notification when a customer evaluates a price of a product in a store will be described. Note that, in the following description, description related to a product sold at a store can be replaced with a service provided at the store. The product or the service whose price is evaluated is also referred to as an evaluation target. The store is, for example, an electric appliance store, a drug store, a supermarket, or the like, but is not particularly limited thereto.

(Configuration)

Figure 1:
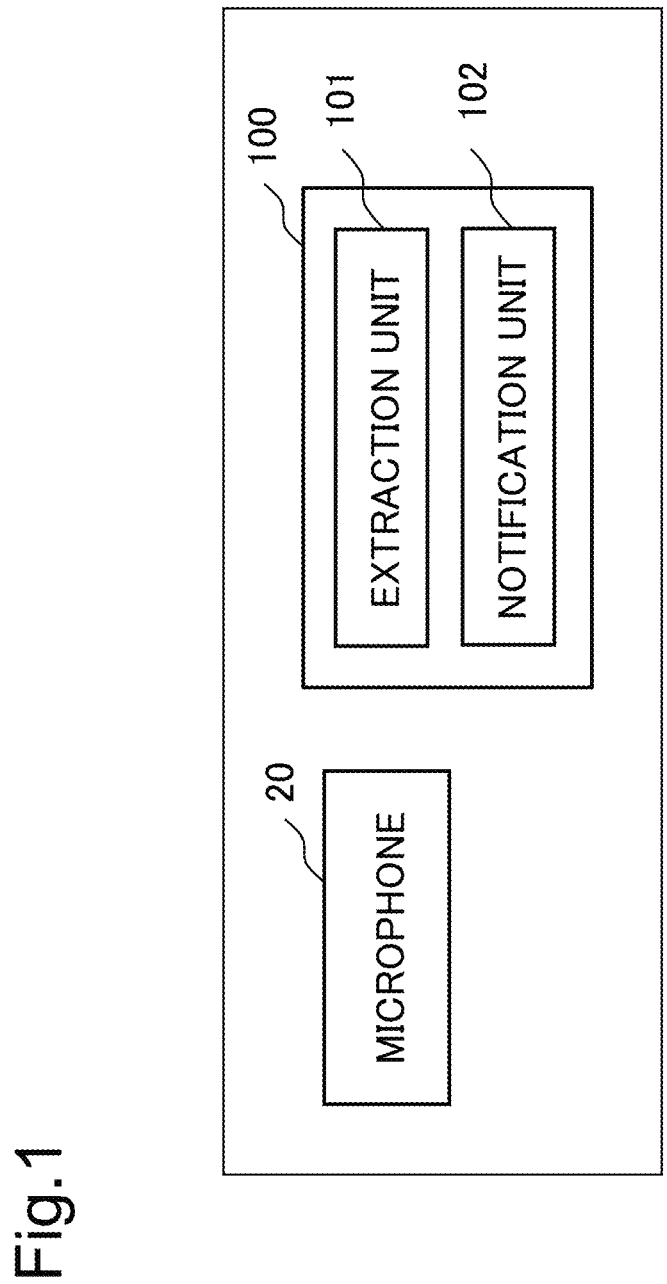
FIG. 1 is a block diagram illustrating a configuration example of a price management system 100 according to a first example embodiment.

FIG. 1 is a block diagram illustrating a configuration example of a price management system 100 according to a first example embodiment. The price management system 100 acquires information on the voice of the customer from one or more microphones 20 installed in the store. The price management system 100 may be installed, for example, in a backyard in the store, or may be installed in a place other than the store. In addition, some or all of the functions of the price management system 100 may be provided in the microphone 20. The price management system 100 may further include other devices.

The microphone 20 is a microphone that collects voices of customers in the store. The microphone 20 is preferably installed near a position where a product and a price of the product are presented. Specifically, it is a selling space of a store or near a product shelf. As long as the product and the price of the product are presented, it may be near a digital signage, a poster, or the like. However, the microphone 20 may be installed at, for example, an accounting register, and the clerk may wear the microphone 20.

The price management system 100 includes an extraction unit 101 and a notification unit 102. The extraction unit 101 and the notification unit 102 are example embodiments of an extraction means and a notification means, respectively.

The extraction unit 101 extracts a phrase related to the evaluation of the price of the product of the store from the voice of the customer collected in the store. Specifically, for example, the extraction unit 101 processes the voice collected by the microphone 20 and converts the voice into text. The extraction unit 101 may acquire a voice converted into text by the microphone 20 or another device (not illustrated). The extraction unit 101 extracts an evaluation phrase related to the evaluation of the price of the product of the store from the voice converted into text using an existing natural language processing technology.

When the phrase is extracted, the notification unit 102 notifies that the price evaluation of the product of the store is detected. Specifically, for example, the notification unit 102 causes any display means to display the notification. The display means is, for example, a monitor, a computer, a mobile terminal, or the like communicably connected to the price management system 100 in a wired or wireless manner.

Note that the notification unit 102 may send a notification of the detection of the price evaluation of a comparison target as a request or proposal to change the price of the evaluation target. The notification unit 102 causes the display means to display, for example, that the price has been evaluated and/or a request to change the price. The administrator of the store who sees the notification sentence displayed on the display means considers changing the price of the product.

(Operation)

Figure 2:
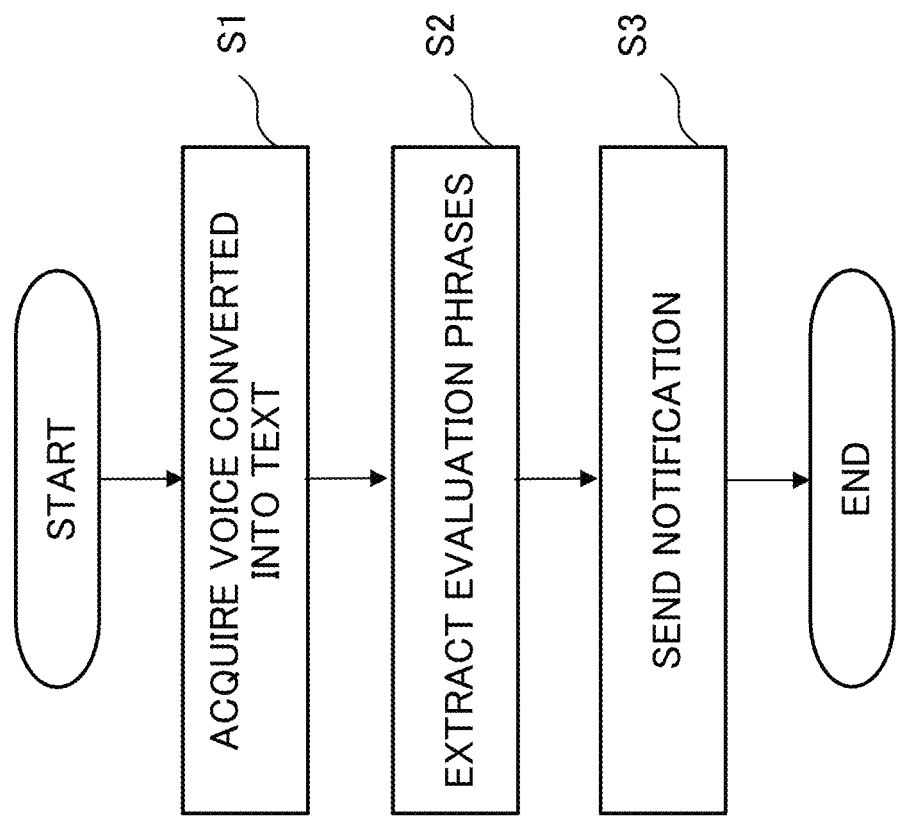
FIG. 2 is a flowchart illustrating an operation example of the price management system 100.

An operation of the price management system 100 when acquiring a voice of a customer from the microphone 20 installed in the vicinity of a selling space where one type of product (product A) is exhibited will be described. FIG. 2 is a flowchart illustrating an operation example of the price management system 100.

For example, one or more customers speak various phrases in front of product A. The microphone 20 collects voice of the customer and transmits a voice signal to the price management system 100. The extraction unit 101 converts the voice collected by the microphone 20 into text, and acquires the voice of the customer converted into text (step S1).

The extraction unit 101 extracts a phrase related to the evaluation of the prices of the products of the store and the products of another store from the voice converted into text (step S2). For example, the extraction unit 101 extracts an evaluation phrase such as "This is a little expensive". For example, the extraction unit 101 recognizes that the price of the product A is evaluated based on the fact that a predetermined phrase such as "this" or "expensive" is included in the voice converted into text.

"This" or the like may be determined in advance as a phrase indicating a product or a service displayed in the store. "Cheap (price)", "expensive (price)", and the like may be determined in advance as expressions indicating a price. The extraction unit 101 may extract a group of phrases including a predetermined phrase from the voice converted into text as an evaluation phrase. Note that extracting the evaluation phrase may include extracting phrases such as "this" and "expensive" from each of the converted voices.

When the evaluation phrase is extracted, the extraction unit 101 transmits detection that the price has been evaluated to the notification unit 102.

When the phrase related to the evaluation of the product price of the store is extracted, the notification unit 102 sends a notification of detection that the price of the product of the store has been evaluated (step S3).

Specifically, for example, the notification unit 102 displays a notification sentence such as "Price is evaluated" on the monitor. FIG. 3 is a diagram illustrating an example of notification displayed by the notification unit 102. The notification unit 102 may display a notification sentence including the speech content of the customer.

The speech content included in the notification sentence includes, for example, the date and time when the voice is acquired, the position, and the recognized text. The position where the voice is acquired is indicated by an identifier for identifying the microphone or the name of the area of the store set by the administrator of the store. The recognized text is obtained by converting a voice of a customer into text. In the recognized text, a phrase used to recognize that the price has been evaluated may be highlighted. For example, in FIG. 3, some phrases are underlined for emphasis.

(Effects)

According to the first example embodiment, it is possible to easily collect the evaluation on the price of the product or the service by the customer. The reason is that the extraction unit 101 extracts a phrase related to the evaluation of the price of the product of the store from the voice of the customer collected in the store. Furthermore, this is because, when the phrase is extracted, the notification unit 102 sends a notification of detection that the price of the product of the store has been evaluated. Further, according to the first example embodiment, it is possible to easily acquire the evaluation on the price of the customer from the content of the conversation between the customers even if the clerk does not attend.

Modification Example

The notification unit 102 may determine whether to send a notification of detection of the price evaluation of the evaluation target based on a predetermined condition.

The notification unit 102 may determine to send a notification when the number of times the phrase of the price evaluation is extracted by the extraction unit 101 exceeds a predetermined number of times. Alternatively, the extraction unit 101 may recognize characteristics of human voice by voice analysis, and may count persons who have evaluated the price while distinguishing them. When the number of customers from which the phrase of the price evaluation is extracted is a predetermined value or more, the notification unit 102 may send a notification of the detection of the price evaluation.

Figure 4:
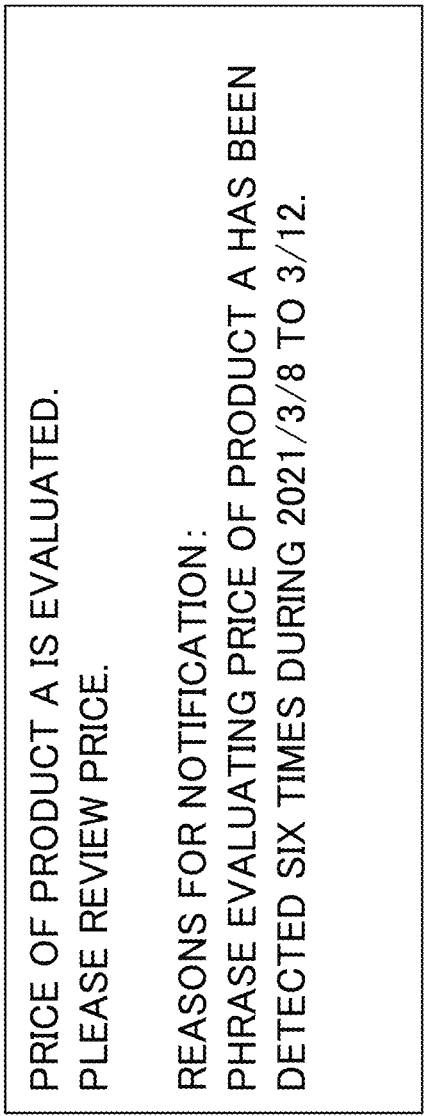
FIG. 4 is a diagram illustrating another example of notification.

FIG. 4 is a diagram illustrating an example of notification displayed by the notification unit 102. The notification of FIG. 4 includes a request for a price change. Furthermore, in the notification, information used by the notification unit 102 to determine whether to send a notification may be illustrated as a reason for notification. In FIG. 4, the number of times a price of a certain product is evaluated within a predetermined period is illustrated as a notification reason.

In addition, the notification unit 102 may determine whether to send a notification of the detection of the price evaluation based on whether the customer who has evaluated the price has purchased the product. For example, when the customer takes out the product from the image of the camera installed in the store and moves, the notification unit 102 determines that the customer has purchased the product. Alternatively, when a customer in the store is identified by any method, and payment for a product or a service whose price has been evaluated is performed, it is determined that the product or the service has been purchased. The notification unit 102 may send a notification of the detection of the price evaluation when the number of people who have evaluated the price and have not purchased the product is a predetermined value or more.

According to the modification example, it is possible to grasp the timing of the price change according to the evaluation of the price of another store by the customer. This is because the notification unit 102 determines whether to send a notification of detection of the price evaluation of the evaluation target based on a predetermined condition.

Second Example Embodiment

In the second example embodiment, a case where the price management system 100 according to the first example embodiment further has a function of specifying a product evaluated by a customer will be described.
(Configuration)

Figure 5:
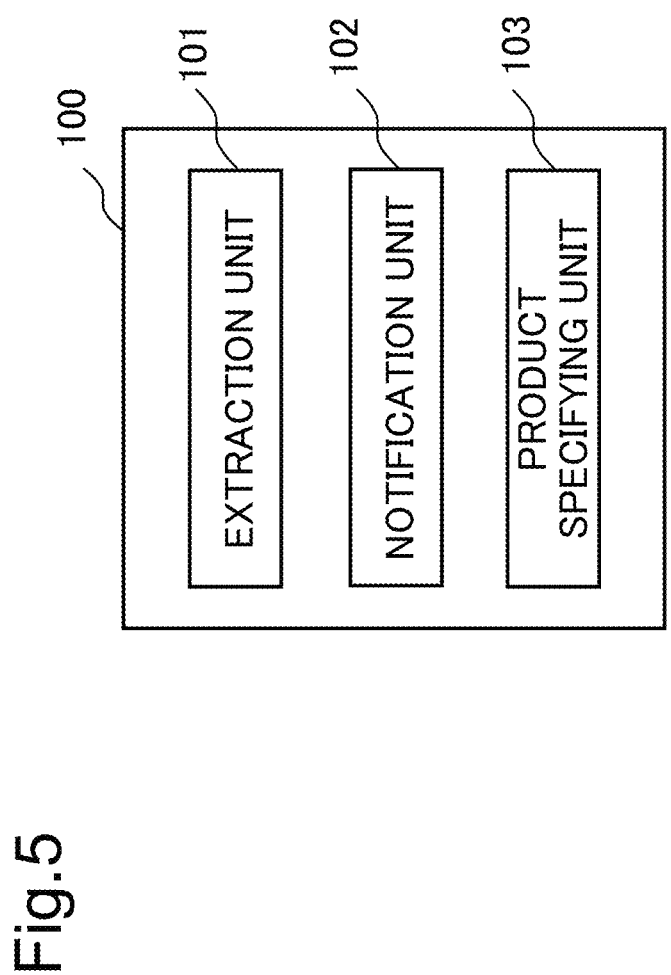
FIG. 5 is a block diagram illustrating a configuration of a price management system 100 according to a second example embodiment.

Regarding the configuration of the second example embodiment, description of the same configuration as that of the first example embodiment will be partially omitted. FIG. 5 is a block diagram illustrating a configuration of a price management system 100 according to the second example embodiment. The price management system 100 according to the second example embodiment includes an extraction unit 101, a notification unit 102, and a product specifying unit 103.

The product specifying unit 103 specifies a product or a service which is an evaluation target based on the voice of the customer in the store. Specifically, for example, the product specifying unit 103 specifies which product the phrase extracted by the extraction unit 101 refers to. The product specifying unit 103 is an example embodiment of a specifying means.

For example, when the phrase extracted by the extraction unit 101 includes specific information for specifying the evaluation target, such as a name, a feature, and an exhibit position of the evaluation target, the product specifying unit 103 specifies the evaluation target based on the specific information.

Alternatively, when a plurality of microphones 20 is installed in the store, the product specifying unit 103 may specify the evaluation target by which microphone 20 the voice of the customer has been collected. For example, the product specifying unit 103 refers to a storage unit that stores each microphone 20 and a product or a service in association with each other, and specifies an evaluation target.

Alternatively, the product specifying unit 103 may further specify the evaluation target based on an image obtained by photographing the customer with a camera installed in the store. For example, the product specifying unit 103 may recognize the position or the direction of the customer from which the voice is collected using the image recognition technology, and specify a product in front of the customer when the customer speaks as the evaluation target.

In addition, when the customer speaks while holding the product in the hand or when the customer speaks while pointing at the product, the product specifying unit 103 recognizes what is being held or pointed based on the image. The product specifying unit 103 specifies an object held in a hand or an object pointed at as an evaluation target.

Alternatively, the product specifying unit 103 specifies a product looked at when the customer speaks as an evaluation target based on the line-of-sight direction of the customer estimated from the image. By using the line-of-sight estimation technique, it is possible to more accurately specify the comparison target when the evaluation target is specified based on the position and direction of the customer.

The product specifying unit 103 may specify the evaluation target as follows. The product or the service and its price may be displayed on a signage whose display changes with time. The product specifying unit 103 may specify a product or a service displayed when the extracted phrase is spoken or within a predetermined time from when the extracted phrase is spoken as an evaluation target.

Figure 6:
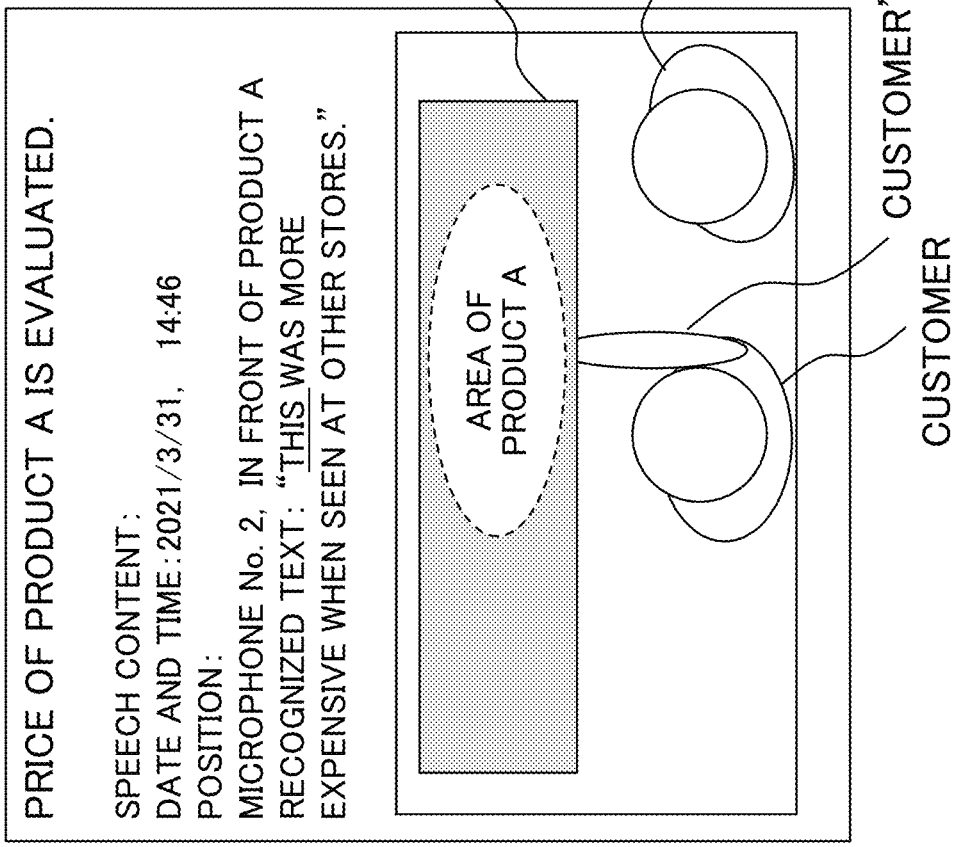
FIG. 6 is a diagram illustrating an example of notification according to the second example embodiment.

The product specifying unit 103 transmits the specified evaluation target to the notification unit 102. The notification unit 102 displays a notification sentence including the specified evaluation target. FIG. 6 is a diagram illustrating an example of notification according to the second example embodiment. FIG. 6 illustrates that the evaluation target is "product A". As in the first example embodiment, the notification unit 102 may display a notification sentence including the speech content of the customer. In the recognized text, a phrase used to specify the evaluation target may be highlighted. Furthermore, the notification displayed by the notification unit 102 may include an image used to specify the evaluation target. FIG. 6 includes an image used to specify an evaluation target obtained by imaging an area where the product A is exhibited from above.
(Operation)

Figure 7:
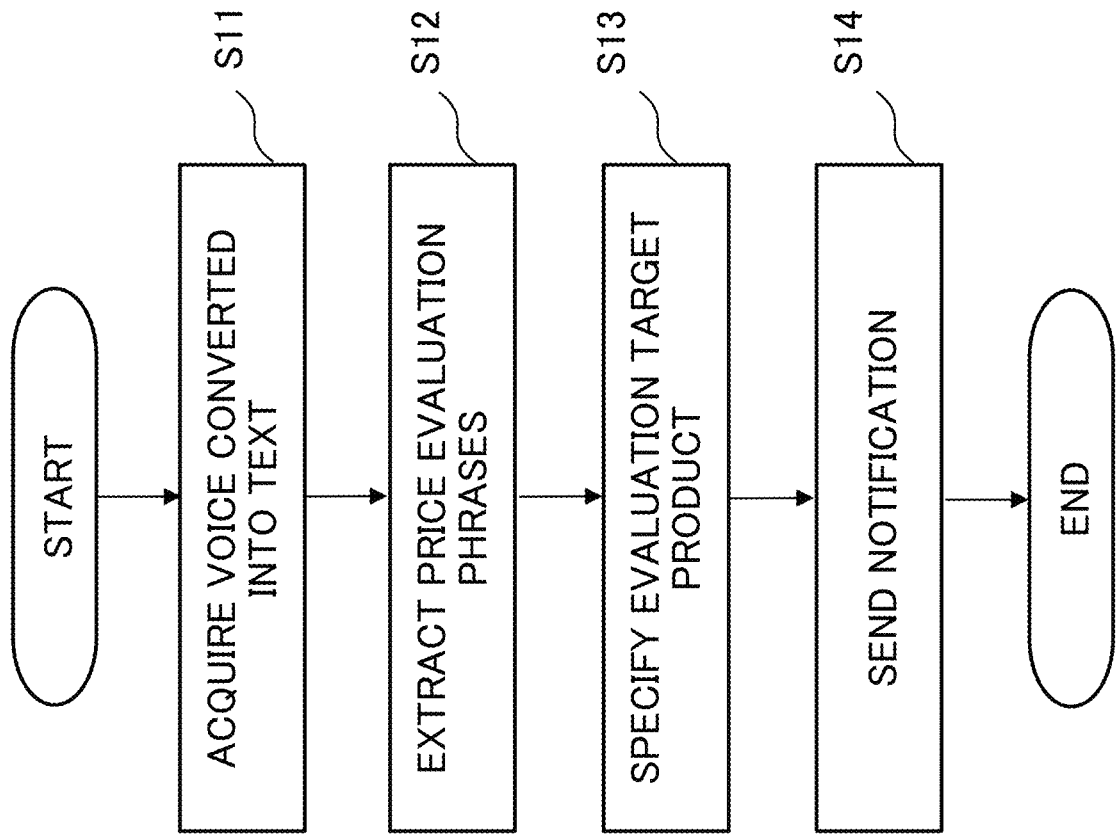
FIG. 7 is a flowchart illustrating an operation example of the price management system 100 according to the second example embodiment.

FIG. 7 is a flowchart illustrating an operation example of the price management system 100 according to the second example embodiment. The basic operation is similar to that of the first example embodiment.

First, the extraction unit 101 acquires the voice of the customer converted into text (step S11). Next, the extraction unit 101 extracts a phrase related to the evaluation of the price of the product of the store and the product of another store from the voice converted into text (step S12). The extraction unit 101 transmits the extracted phrase to the notification unit 102 and the product specifying unit 103. The product specifying unit 103 specifies an evaluation target product (step S13). The product specifying unit 103 transmits the specified evaluation target to the notification unit 102. When the evaluation phrase is detected by the extraction unit 101, the notification unit 102 sends a notification related to the evaluation target specified by the product specifying unit 103 (step S14).

(Effects)

According to the second example embodiment, it is possible to grasp the evaluation target of the price by the customer among the plurality of products installed in the store. The reason is that the product specifying unit 103 specifies the evaluation target product or service based on the voice of the customer in the store.

Third Example Embodiment

In the first and second example embodiments, evaluating the price also includes comparing the price of the product of the store with the price of the product of another store by the customer. In the third example embodiment, a price management system 100 that sends a notification when a customer compares the price of a product in a store with the price of another store will be described. A product or a service of another store compared between the evaluation target of the store and the other store is also referred to as a comparison target.

Regarding the configuration of the third example embodiment, description of the same configuration as that of the first example embodiment will be partially omitted. In the third example embodiment, the extraction unit 101 extracts a phrase related to comparison between the price of the evaluation target of the store and the price of the comparison target of another store from the voice of the customer collected in the store as a phrase related to the evaluation of the price of the evaluation target. The extraction unit 101 extracts a comparison phrase related to comparison between the prices of the products of the store and the products of the other store from the voice converted into text using an existing natural language processing technology.

For example, the extraction unit 101 extracts a comparison phrase such as "This was more expensive when seen at other stores". The extraction unit 101 recognizes that the price of a product is being compared with that of another store based on, for example, that a predetermined phrase such as "this", "another store", or "more expensive" is included in the voice converted into text. "Another store" or the like can be determined in advance as a phrase indicating a topic of a product of another store. In addition, an expression indicating comparison or the like may be determined in advance.

The extraction unit 101 may extract a group of phrases including a predetermined phrase from a voice converted into text as a comparison phrase. Note that extracting the comparison phrase may also include extracting phrases such as "this", "another store", "more", and "expensive" from the respective voices converted into text.

When the comparison phrase is extracted, the extraction unit 101 transmits detection that the prices are compared to the notification unit 102.

The notification unit 102 sends a notification of the detection of price comparison with another store as detection of price evaluation. That is, when the comparison phrase is extracted, the notification unit 102 notifies that the price comparison of the products of the store has been detected. Note that the notification unit 102 may send a notification of the detection of the price comparison of the comparison target as a request or proposal to change the comparison target price.

When a phrase related to comparison between the prices of the products of the store and the products of another store is extracted, the notification unit 102 sends a notification of detection that the prices of the products of the store are compared. Specifically, for example, the notification unit 102 displays a notification sentence such as "Price is being compared with other stores" on the monitor. FIG. 8 is a diagram illustrating an example of notification according to the third example embodiment.

As in the first example embodiment, the notification unit 102 may display a notification sentence including the speech content of the customer. In the recognized text, a phrase used for recognizing that the recognized text is compared with another store may be displayed in a highlighted manner.

(Effects)

According to the third example embodiment, it is possible to easily collect the evaluation of the price of the product or the service with respect to another store by the customer. This is because the extraction unit 101 extracts a phrase related to comparison between the price of the product of the store and the price of the product of another store from the voice of the customer collected in the store. Furthermore, this is because the notification unit 102 sends a notification of detection that the prices of the products of the store are compared when the phrase is extracted. The clerk can obtain information on the price of another store from the customer without going to another store.

In addition, in the third example embodiment, the notification unit 102 does not send the notification when the customer simply says that the price of the product is high, and sends the notification when the price is compared with the price of the product of another store. When the customer simply says that the price of the product is high, the sales price of the manufacturer is high, and there is a possibility that the product will be sold at the same price at other stores. When the notification unit 102 sends the notification when the product is compared with the product of another store, the administrator of the store can consider changing the price for competing with the other store.

Modification Example 1

In the third example embodiment, the price management system 100 may specify which store the price is compared with.

Specifically, the extraction unit 101 may extract a phrase specifying the store being compared from the voice of the customer converted into text. The extraction unit 101 may refer to, for example, a store name database in which a store and an expression specifying the store are associated, stored in a storage unit (not illustrated). As an expression for specifying a store, a plurality of names of one store may be stored. The extraction unit 101 extracts which store's price is compared from the voice of the customer.

FIG. 9 is a diagram illustrating an example of a store name database. For example, FIG. 9 is a diagram illustrating an example of a database when voice of a customer is collected by the microphone 20 installed in the store of a drug store X. For example, it is assumed that there is a drug store Y neighboring the drug store X. Furthermore, it is assumed that there is a supermarket Z in front of a station near the drug store X.

For example, when the customer speaks "Y drug", "Y (abbreviation of drug store Y)", "neighboring store", or the like, the extraction unit 101 extracts these phrases as information specifying the drug store Y. Similarly, when the customer speaks "here", "X drug", or the like, the extraction unit 101 extracts these phrases as information for specifying the drug store X.

For example, it is assumed that a customer speaks "It was more expensive when seen in the neighboring store" in front of the product A displayed in the drug store X. The "neighboring store" included in the speech is identified as "drug store Y". The notification unit 102 causes the monitor to display a notification sentence "The price of Product A is being compared with that of Drug Store Y" based on the phrase extracted by the extraction unit 101.

Modification Example 2

Furthermore, in the third example embodiment, the price management system 100 may extract information on the price of the comparison target of another store based on the voice of the customer. The price management system 100 may recognize whether the price of the product of the store is more expensive, cheaper, or the same as that of the other store from the voice of the customer as the information on the price of the comparison target of the other store.

Specifically, the extraction unit 101 analyzes the meaning of the phrase extracted using the existing technology, and recognizes the comparison result by the customer. For example, from a voice of a customer such as "The neighboring store was more expensive", the extraction unit 101 recognizes a comparison result of "The other store is more expensive". From the voice "Y is cheaper than here", the extraction unit 101 recognizes the comparison result "the other store is cheaper". From the voice "same price as over there", the extraction unit 101 recognizes a comparison result of "same price as the other store".

The extraction unit 101 may transmit the comparison result by the customer to the notification unit 102. For example, the notification unit 102 displays a notification sentence "The price of product A seems to be more expensive than the other store" on the monitor.

The extraction unit 101 may further extract the price of the product of another store from the voice of the customer. For example, a customer says "It was 3500 yen for Y drug" in front of product A displayed in drug store X. The extraction unit 101 extracts that the price of the product A of another store is 3500 yen.

Furthermore, the price management system 100 may include a comparison unit that compares the price of the product A at the store where the microphone 20 is installed with the price of another store extracted by the extraction unit 101. The comparison unit may refer to, for example, a price database in which a product and a set price in a store are associated with each other, which is stored in a storage unit (not illustrated). For example, when the price of the product A of another store is extracted to be 3500 yen and the set price of the product A is stored in the price database to be 3999 yen, the comparison unit derives a comparison result that the price of the product A at another store is cheaper.

The comparison unit may transmit the comparison result to the notification unit 102. The notification unit 102 may further send a notification based on a comparison result by the comparison unit.

FIG. 10 is a diagram illustrating another example of the notification according to Modification example 1 and Modification example 2. The notification of FIG. 10 includes which store the price is compared with, as illustrated in Modification example 1. Furthermore, in the notification of FIG. 10, as shown in Modification example 2, "The drug store Y seems to be cheaper" is displayed as the comparison result by the customer. As in the first example embodiment, the notification unit 102 may display a notification sentence including the speech content of the customer. At this time, in the displayed recognized text, the expression specifying the store being compared and the phrase used for recognizing the comparison result by the customer may be displayed in a highlighted manner. In FIG. 10, "Y drug" and "3500 yen" are emphasized by Underlines.

Modification Example 3

The notification unit 102 may determine whether to send a notification of detection of the price evaluation of the evaluation target based on the following conditions.

(1) The notification unit 102 may determine whether to send a notification of detection of the price comparison of the comparison target based on the information on the comparison target price of another store. Specifically, for example, the notification unit 102 may use the comparison result by the customer shown in Modification example 2. The extraction unit 101 or the comparison unit recognizes that another store is more expensive or cheaper from the voice of the customer. When it is recognized that another store is more expensive or cheaper, the notification unit 102 may send a notification of detection of price comparison. Note that the notification unit 102 may send a notification of the detection of the price comparison even when it is recognized that the price is the same as that of another store.

(2) The notification unit 102 may make the determination on the condition of the time when the comparison target is provided at another store at the price compared by the customer. The extraction unit 101 may extract the time when the product or the service is provided at the price of another store from the voice of the customer. The notification unit 102 sends a notification of the detection of price comparison for a product or a service provided at another store at the price within a predetermined period.

For example, the extraction unit 101 extracts "It is more expensive than the store we saw earlier" as a phrase related to comparison of prices of products or services of another store. From this phrase, the extraction unit 101 recognizes that the price of another store is evaluated to be cheaper than the set price of the store. Furthermore, the extraction unit 101 may extract a phrase "saw earlier" from the voice as the time when the product or the service was provided at the price of another store. With this phrase, the extraction unit 101 may recognize that today's prices are compared.

For example, when the price is compared with the price of another store within a predetermined period from the current date and time, the notification unit 102 may notify that the price is being compared. Based on the notification, the price of the product of the store may be changed in opposition to the price of the product of another store within one week from the current date and time. In addition, based on the notification, it can be predicted that another store is having a discount sale today. For example, when the price is compared with the price of another store last year or several months ago, the notification unit 102 may exclude the price from the notification target.

In a drug store or an electric appliance store, the price of a product of a competing store may change from day to day, and thus, it takes cost to review the price according to the change. According to this modification example, a result compared with a recent price can be used to review the result.

(3) The notification unit 102 may make a determination using the position of another store as a condition. The notification unit 102 may send a notification of the detection of the price comparison for the product or the service of another store within a predetermined range from the position of the store. For example, when the price is compared with the price of another store not included in the predetermined range, the notification unit 102 may not send the notification. The predetermined range can be set by a distance or a region of the store.

Specifically, the extraction unit 101 extracts a phrase specifying a store as described in Modification example 1 of the third example embodiment. For example, when a store other than the competing store registered in advance is specified from the voice of the customer, the extraction unit 101 does not transmit the fact that the price has been compared to the notification unit 102. Alternatively, when the extracted phrase includes a phrase specifying a different country or a distant region in the voice of the customer, the extraction unit 101 does not transmit the fact that the price has been compared to the notification unit 102.

Furthermore, when the price is compared with the price on the Internet sales site, the extraction unit 101 may not transmit the fact that the price has been compared to the notification unit 102. For example, the extraction unit 101 specifies whether the name of the Internet sales site or a phrase such as "web" is included within a predetermined number of characters before and after the phrase for comparing prices. When the above phrase is included, it is determined that the customer compares the price of the store with the price of the Internet sale.

Fourth Example Embodiment

In the fourth example embodiment, a case where the price management system 100 according to the first example embodiment further determines a new price of the evaluation target will be described.

Configuration

Figure 11:
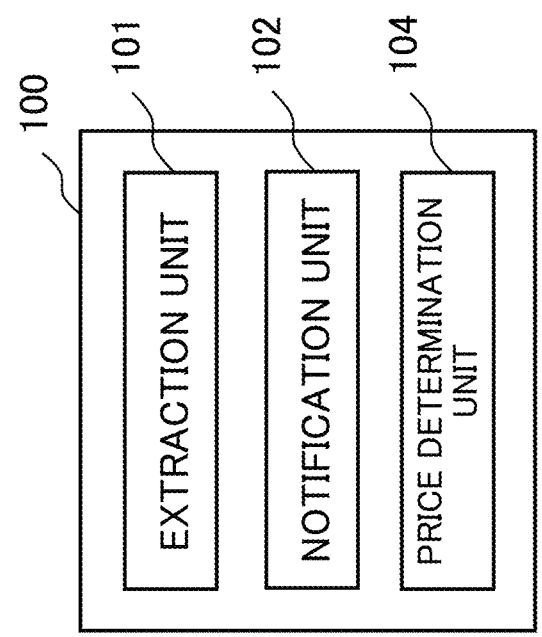
FIG. 11 is a block diagram illustrating a configuration of a price management system 100 according to a fourth example embodiment.

FIG. 11 is a block diagram illustrating a configuration of a price management system 100 according to the fourth example embodiment. The price management system 100 according to the fourth example embodiment includes an extraction unit 101, a notification unit 102, and a price determination unit 104. Regarding the configuration of the fourth example embodiment, description of the same configuration as that of the first example embodiment will be partially omitted. The price management system 100 according to the fourth example embodiment may further include the product specifying unit 103 according to the second example embodiment. In addition, the configurations of the extraction unit 101 and the notification unit 102 may be similar to those of the third example embodiment.

In the above description, the case where the notification unit 102 causes the display means to display the notification sentence and notifies the administrator has been described. However, the notification unit 102 may notify the device of detection of the price evaluation of the evaluation target. For example, the notification unit 102 may notify the price determination unit 104 of the detection of the price evaluation. In the fourth example embodiment, the notification unit 102 may not cause the display means to display the detection of the price evaluation.

Upon receiving the notification of detection of the price evaluation, the price determination unit 104 determines a new price of the evaluation target. The price determination unit 104 is an example embodiment of a price determination means.

Figure 12:
FIG. 12 is a diagram showing an example of a display screen of an electronic shelf label.

The notification unit 102 may cause any display means to display the new price determined by the price determination unit 104. The administrator may view the displayed new price and change the setting of the price of the product or the service. Alternatively, the price determination unit 104 may change the price displayed on the electronic shelf label installed in the store to the determined new price. The electronic shelf label presents a price of a product, and the display can be electronically rewritten. FIG. 12 is a diagram showing an example of a display screen of the electronic shelf label.

The price determination unit 104 may determine the price of the evaluation target of the store based on the information on the price of the comparison target of the other store. Specifically, for example, the price determination unit 104 may use the comparison result by the customer shown in Modification example 2 of the third example embodiment. The extraction unit 101 or the comparison unit recognizes that another store is more expensive or cheaper from the voice of the customer. When it is recognized that the other store is more expensive, the price determination unit 104 may raise the current set price. When it is recognized that the other store is cheaper, the price determination unit 104 may lower the current set price. Note that the price determination unit 104 may also determine to raise or lower the price when it is recognized that the price is the same as that of another store.

When determining a new price, the price determination unit 104 may determine the price with reference to a preset allowable range of change. The allowable range may be indicated by an upper limit or a lower limit of the new price, or may be indicated by an upper limit of the change range so that the price does not change greatly at a time.

The price determination unit 104 may change the price by a predetermined change width. Further, the price determination unit 104 may repeat the price change until the sales for each predetermined period increase or decrease by a predetermined amount. For example, the price determination unit 104 may repeat the price change with a predetermined width until the sales of the evaluation target product or service of which the detection of the price evaluation in the store is notified increase by a predetermined amount within a predetermined period before the price change and within a predetermined period after the price change.

The price determination unit 104 may determine a new price immediately after receiving the notification of detection of the price evaluation from the notification unit 102. The price determination unit 104 may immediately reflect the new price on the electronic shelf label. However, the price determination unit 104 may determine a new price to be reflected after a predetermined period from the date on which the notification is received from the notification unit 102.

The notification unit 102 may display that the price displayed on the electronic shelf label has been changed on the display means browsed by the administrator of the store.

FIG. 13 is a diagram illustrating an example of the price change notification displayed on the display means by the notification unit 102 after the price determination unit 104 changes the price. The notification of FIG. 13 includes the new price and the grounds that the price determination unit 104 has determined the price. In FIG. 13, the grounds for the determination include the price of the product before the change, the price of another store, and the lower limit price of the allowable range of the change. In FIG. 13, the price of another store is unknown because it is not extracted from the voice of the customer, but according to the comparison result by the customer, it is recognized that the price of another store is cheaper. Therefore, the price has been changed to the lower limit price of the allowable range of change.

(Operation)

Figure 14:
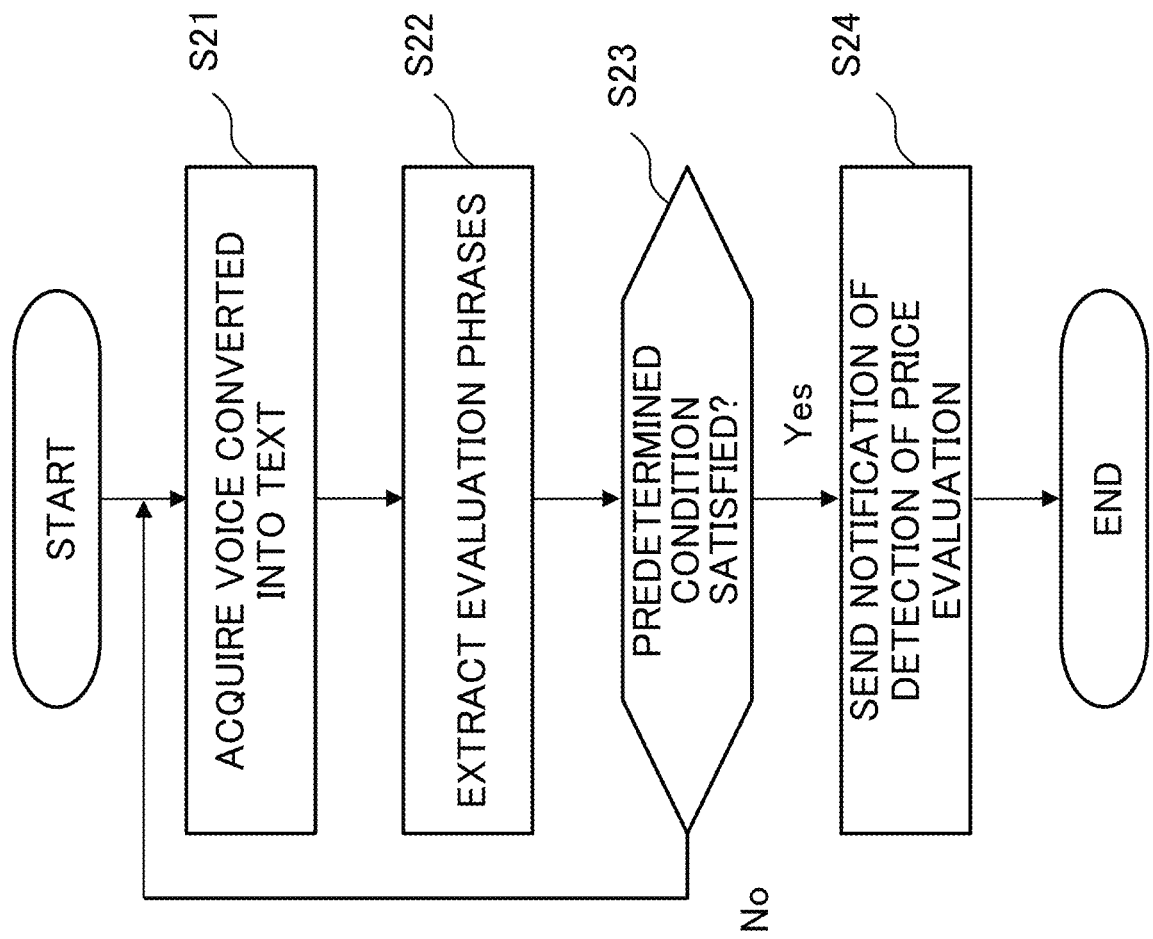
FIG. 14 is a flowchart illustrating an operation example of an analysis server.
Figure 15:
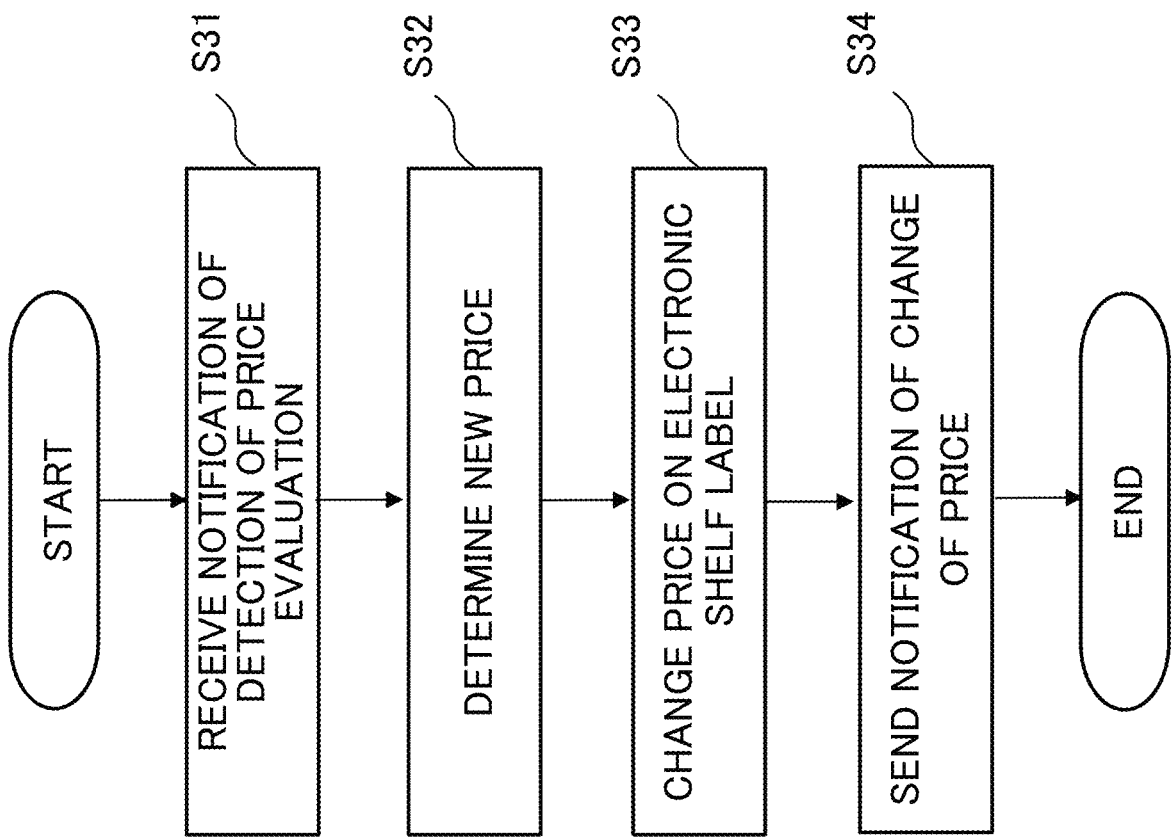
FIG. 15 is a flowchart illustrating an operation example of a product management server.

An operation example of the price management system 100 will be described. Each component of the price management system 100 may be provided in a different device for each component. For example, the extraction unit 101 and the notification unit 102 may be included in the analysis server, and the price determination unit 104 may be included in the product management server. FIG. 14 is a flowchart illustrating an operation example of the analysis server. FIG. 15 is a flowchart illustrating an operation example of the product management server. In FIG. 14, the operations of steps S21 to S22 of the analysis server are basically similar to the description of the operation of the first example embodiment. After step S22, when the predetermined condition as exemplified in Modification example 3 is satisfied (step S23: Yes), the notification unit 102 sends a notification of the detection of the price evaluation by the customer (step S24). When the predetermined condition is not satisfied (step S23: No), the analysis server repeats the processing of steps S21 and S22.

Referring now to FIG. 15, the price determination unit 104 of the product management server receives a notification of detection of the price evaluation from the analysis server (step S31). The price determination unit 104 determines a new price (step S32). Furthermore, the price determination unit 104 changes the price displayed on the electronic shelf label (step S33). The notification unit 102 receives the execution of the price change from the price determination unit 104, and notifies the store administrator or the like that the price change has been executed (step S34).

(Effects)

According to the fourth example embodiment, the price can be changed according to the evaluation of the price of another store by the customer. The reason is that the price determination unit 104 receives the detection of the price evaluation and determines a new price of the product or the service. Furthermore, according to the fourth example embodiment, the price presented together with the product can be changed according to the evaluation of the price of another store by the customer. The reason is that the price determination unit 104 changes the price displayed on the electronic shelf label to the new price.

Modification Example

Each of the above example embodiments can be modified as follows. That is, the notification unit 102 may determine whether to send a notification of detection of the price evaluation of the evaluation target based on the condition as to whether the voice of the customer is false.

When the voice of the customer from which the phrase related to the comparison is extracted is estimated to be a voice made by a false statement, the notification unit 102 may not send a notification of the detection of the price comparison of the comparison target. For example, the price management system 100 may further include an estimation unit that estimates a false statement.

The estimation unit may analyze the emotion based on the voice and estimate the possibility of a lie. The estimation unit may further perform expression analysis or behavior analysis based on the image of the customer to estimate the possibility of a lie. For example, when it is estimated that the customer is not considering the purchase of the product by the behavior analysis of the customer in the store, the estimation unit may estimate that the statement of comparing with the price of another store is a lie.

In addition, the price management system 100 may identify a customer in the store by any method and check whether the customer is on a blacklist. The customer may be identified by, for example, a voice or a face image. A customer who has made false comparisons many times, an annoying customer, an employee of another store, and the like are added to the blacklist in advance. The estimation unit may estimate that a statement by a customer on the blacklist is a false statement.

[Hardware Configuration]

In each of the above-described example embodiments, each component of the price management system 100 indicates a functional block. A part or all of each component of each device may be achieved by any combination of a computer 500 and the program.

Figure 16:
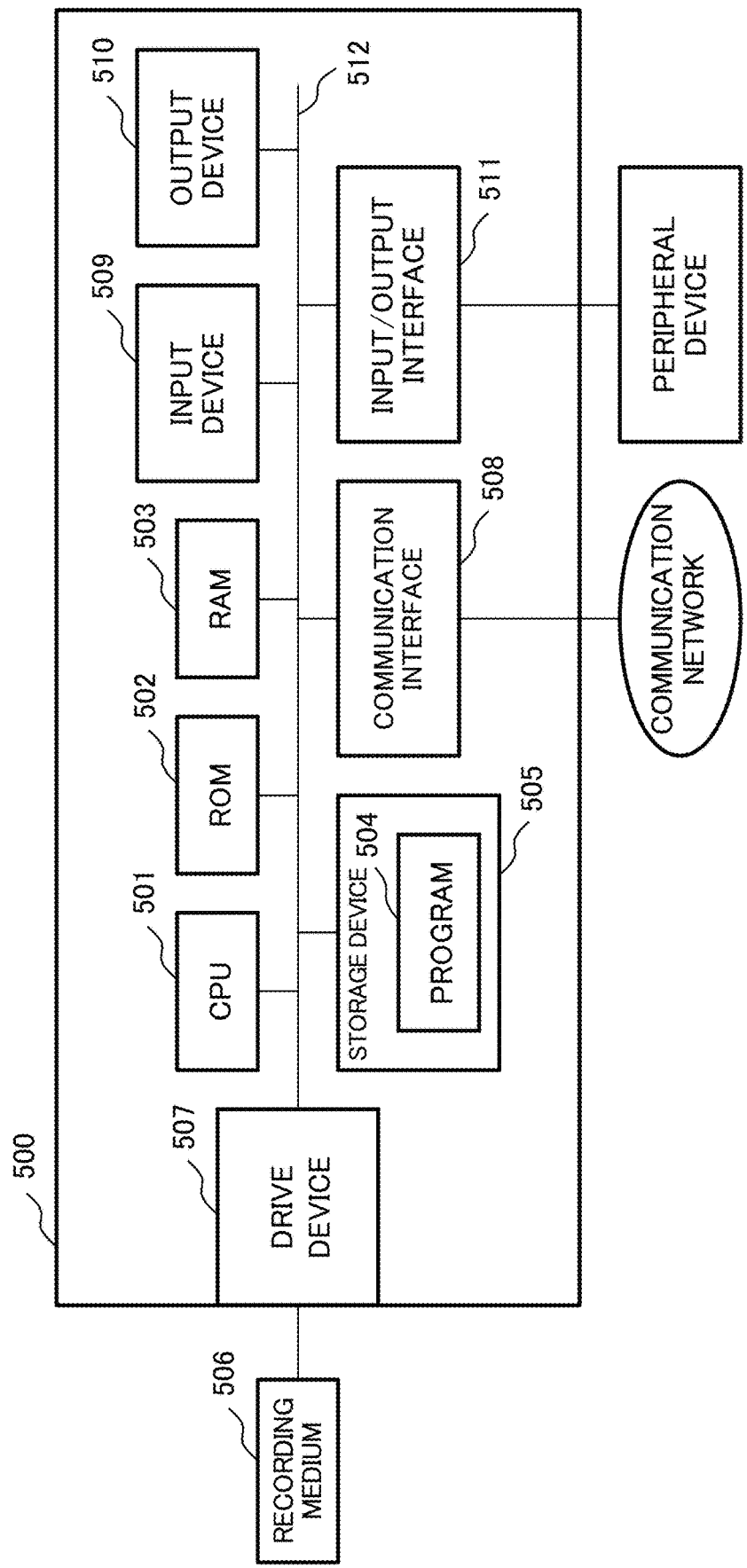
FIG. 16 is a block diagram illustrating an example of a hardware configuration of a computer 500.

FIG. 16 is a block diagram illustrating an example of a hardware configuration of the computer 500. Referring to FIG. 16, the computer 500 includes, for example, a central processing unit (CPU) 501, a read only memory (ROM) 502, a random access memory (RAM) 503, a program 504, a storage device 505, a drive device 507, a communication interface 508, an input device 509, an input/output interface 511, and a bus 512.

The program 504 includes instructions for achieving each function of each device. The program 504 is stored in advance in the ROM 502, the RAM 503, and the storage device 505. The CPU 501 achieves each function of each device by executing instructions included in the program 504. For example, the CPU 501 of the price management system 100 executes instructions included in the program 504 to implement the function of the price management system 100. Furthermore, the RAM 503 may store data to be processed in each function of each device. For example, a voice of a customer converted into text in the price management system 100 may be stored in the RAM 503 of the computer 500.

The drive device 507 reads and writes data from and to the recording medium 506. The communication interface 508 provides an interface with a communication network. The input device 509 is, for example, a mouse, a keyboard, or the like, and receives an input of information from a store administrator or the like. The output device 510 is, for example, a display, and outputs (displays) information to an administrator or the like. The input/output interface 511 provides an interface with a peripheral device. The bus 512 connects the individual components of the hardware. Note that the program 504 may be supplied to the CPU 501 via a communication network, or may be stored in the recording medium 506 in advance, read by the drive device 507, and supplied to the CPU 501.

Note that the hardware configuration illustrated in FIG. 16 is an example, and other components may be added or some components may not be included.

There are various modification examples of the implementation method of each device. For example, each device may be achieved by any combination of a computer and a program different for each component. In addition, a plurality of components included in each device may be achieved by any combination of one computer and a program.

In addition, some or all of the components of each device may be achieved by general-purpose or dedicated circuitry including a processor or the like, or a combination thereof. These circuits may be configured by a single chip or may be configured by a plurality of chips connected via a bus. Some or all of the components of each device may be achieved by a combination of the above-described circuit or the like and a program.

In addition, when some or all of the components of each device are achieved by a plurality of computers, circuits, and the like, the plurality of computers, circuits, and the like may be arranged in a centralized manner or in a distributed manner.

In addition, at least a part of the price management system 100 may be provided in a SaaS (software as a service) format. That is, at least a part of the functions for achieving the price management system 100 may be executed by software executed via a network.

While the present disclosure has been particularly shown and described with reference to exemplary embodiments thereof, the present disclosure is not limited to these example embodiments. It will be understood by those of ordinary skill in the art that various changes in form and details may be made therein without departing from the spirit and scope of the present disclosure as defined by the claims. In addition, the configurations in the respective example embodiments can be combined with each other without departing from the scope of the present disclosure.

Some or all of the above example embodiments can be described as the following supplementary notes, but are not limited to the following.

[Supplementary Note 1]
A price management system including:
an extraction means configured to extract a phrase related to evaluation of a price of a product or a service that is an evaluation target from a voice of a customer collected in a store; and
a notification means configured to send a notification of detection of price evaluation when the phrase is extracted.

[Supplementary Note 2]
The price management system according to Supplementary Note 1, wherein
the notification means determines whether to send a notification of detection of the price evaluation based on a predetermined condition.

[Supplementary Note 3]
The price management system according to Supplementary Note 2, wherein
the notification means sends a notification of the detection of the price evaluation when the number of times a phrase related to the evaluation is extracted or the number of customers from which the phrase is extracted is a predetermined value or more for the evaluation target.

[Supplementary Note 4]
The price management system according to any one of Supplementary Notes 1 to 3, wherein
the extraction means extracts, as the phrase related to the evaluation, a phrase related to comparison between a price of the evaluation target and a price of a product or a service that is a comparison target of another store, and
the notification means sends a notification of the detection of price comparison with the other store as detection of the price evaluation.

[Supplementary Note 5]
The price management system according to Supplementary Note 4, wherein
the extraction means extracts information on the price of the comparison target of the other store from the voice, and
the notification means determines whether to send a notification of detection of the price evaluation based on information on the price of the comparison target of the other store.

[Supplementary Note 6]
The price management system according to Supplementary Note 4 or 5, wherein
the extraction means extracts, from the voice, a time when the comparison target is provided in the other store at the comparison target price of the other store, and
the notification means sends a notification of the detection of the price evaluation when the time is within a predetermined period.

[Supplementary Note 7]
The price management system according to any one of Supplementary Notes 4 to 6, wherein
the notification means sends a notification of the detection of the price evaluation when a position of the other compared store is within a predetermined range from a position of the store.

[Supplementary Note 8]
The price management system according to any one of Supplementary Notes 2 to 7, wherein
the notification means does not send a notification of detection of the price evaluation when the voice from which the phrase related to the evaluation is extracted is estimated to be a voice made by a false statement.

[Supplementary Note 9]
The price management system according to any one of Supplementary Notes 1 to 8, further including:
a specifying means configured to specify the evaluation target based on the voice.

[Supplementary Note 10]
The price management system according to Supplementary Note 9, wherein
the specifying means further specifies the evaluation target based on an image obtained by photographing the customer.

[Supplementary Note 11]
The price management system according to Supplementary Note 10, wherein
the specifying means specifies the evaluation target based on a line-of-sight direction of the customer estimated based on the image.

[Supplementary Note 12]
The price management system according to any one of Supplementary Notes 1 to 11, further including:
a price determination means configured to determine a new price of the evaluation target of the store upon receiving the detection of the price evaluation.

[Supplementary Note 13]
The price management system according to Supplementary Note 12, wherein
the price determination means changes a price displayed on an electronic shelf label of the evaluation target installed in the store.

[Supplementary Note 14]

The price management system according to Supplementary Note 12 or 13, wherein the extraction means extracts, from the voice, information on a price of a product or a service that is a comparison target of another store, and the price determination means determines the price of the evaluation target of the store based on the information on the price of the comparison target of the other store.

[Supplementary Note 15]

The price management system according to any one of Supplementary Notes 12 to 14, wherein the price determination means repeats determination to change the price by a predetermined width until sales of the evaluation target of the store for each predetermined period increase or decrease by a predetermined amount.

[Supplementary Note 16]

A price management method including:

extracting a phrase related to evaluation of a price of a product or a service that is an evaluation target from a voice of a customer collected in a store; and sending a notification of detection of price evaluation when the phrase is extracted.

[Supplementary Note 17]

A non-transitory recording medium that records a program for causing a computer to execute:

a process of extracting a phrase related to evaluation of a price of a product or a service that is an evaluation target from a voice of a customer collected in a store; and a process of sending a notification of detection of price evaluation when the phrase is extracted.

REFERENCE SIGNS LIST

100 Price management system
101 Extraction unit
102 Notification unit
103 Product specifying unit
104 Price determination unit
20 Microphone

What is claimed is:

1. A price management system comprising:
at least one memory storing instructions; and
at least one processor configured to execute the instructions to:
  collect a voice of a customer in a store using a microphone installed in the store;
  analyze the collected voice of the customer, in order to extract a phrase related to evaluation of whether a price of a product or service at the store and that is an evaluation target is inexpensive or expensive from the collected voice of the customer;
  compare the price of the product or service at the store with a price of the product or service at another store based on the extracted phrase;
  determine a new price of the evaluation target at the store upon comparison of the product or service at the store with the price of the product or service at the another store;
  change the price displayed on an electronic shelf label of the evaluation target installed in the store to the new price, based on the phrase extracted from the voice indicating whether the price of the product or service is inexpensive or expensive;
  based upon the determined new price, transmit an instruction to the electronic shelf label installed in the store to change the price displayed on the electronic shelf label, wherein the instruction controls a display of the electronic shelf label to display the new price, and controls the display of the electronic shelf label to display an indication that the price at the store has been changed to compete with the price at the another store; and
  send a notification regarding detection of price evaluation and change in the price displayed to a store clerk terminal.

2. The price management system according to claim 1, wherein the at least one processor is further configured to execute the instructions to:
  determine whether to send the notification regarding the detection of the price evaluation based on a predetermined condition.

3. The price management system according to claim 2, wherein the at least one processor is further configured to execute the instructions to:
  determine to send the notification regarding the detection of the price evaluation when a number of times the phrase related to the evaluation is extracted or a number of customers from which the phrase is extracted is a predetermined value for the evaluation target or more, the predetermined value being at least 2.

4. The price management system according to claim 1, wherein the at least one processor is further configured to execute the instructions to:
  extract, as the phrase related to the evaluation, a phrase related to the comparison between a price of the evaluation target and the price of the product or the service that is a comparison target of the another store; and
  send, as the notification regarding the detection of price evaluation, a notification of the comparison.

5. The price management system according to claim 4, wherein the at least one processor is further configured to execute the instructions to:
  extract information on the price of the comparison target of the another store from the collected voice; and
  determine whether to send the notification regarding the detection of the price evaluation based on information on the price of the comparison target of the another store.

6. The price management system according to claim 4, wherein the at least one processor is further configured to execute the instructions to:
  extract, from the collected voice, a time when the comparison target is provided in the another store at the price of the another store; and
  determine to send the notification of the detection regarding the price evaluation when the time is within a predetermined period.

7. The price management system according to claim 4, wherein the at least one processor is further configured to execute the instructions to:
  determine to send the notification regarding the detection of the price evaluation when a position of the another store is within a predetermined range from a position of the store.

8. The price management system according to claim 2, wherein the at least one processor is further configured to execute the instructions to:
  determine not to send the notification regarding the detection of the price evaluation when the collected voice from which the phrase related to the evaluation is extracted is estimated to have been made by a false statement.

9. The price management system according to claim 1, wherein the at least one processor is further configured to execute the instructions to:
specify the evaluation target based on the collected voice.

10. The price management system according to claim 9, wherein the at least one processor is further configured to execute the instructions to:
specify the evaluation target based on an image obtained by photographing the customer.

11. The price management system according to claim 10, wherein the at least one processor is further configured to execute the instructions to:
specify the evaluation target based on a line-of-sight direction of the customer that is estimated based on the image.

12. The price management system according to claim 1, wherein the at least one processor is further configured to execute the instructions to:
extract, from the collected voice, information on the price of the product or the service that is a comparison target of the another store; and
determine the new price of the evaluation target of the store based on the information on the price of the comparison target of the another store.

13. The price management system according to claim 1, wherein the at least one processor is further configured to execute the instructions to:
repeat changing the price by a predetermined amount until sales of the evaluation target of the store increase or decrease by a predetermined amount.

14. A price management method performed by a computer and comprising:
collecting a voice of a customer in a store using a microphone installed in the store;
analyzing the collected voice of the customer, in order to extract a phrase related to evaluation of whether a price of a product or service at the store and that is an evaluation target is inexpensive or expensive from the collected voice of the customer;
comparing the price of the product or service at the store with a price of the product or service at another store based on the extracted phrase;
determining a new price of the evaluation target at the store upon comparison of the product or service at the store with the price of the product or service at the another store;
changing the price displayed on an electronic shelf label of the evaluation target installed in the store to the new price, based on the phrase extracted from the voice indicating whether the price of the product or service is inexpensive or expensive;
based upon the determined new price, transmitting an instruction to the electronic shelf label installed in the store to change the price displayed on the electronic shelf label, wherein the instruction controls a display of the electronic shelf label to display the new price, and controls the display of the electronic shelf label to display an indication that the price at the store has been changed to compete with the price at the another store; and
sending a notification regarding detection of price evaluation and change in the price displayed to a store clerk terminal.

15. A non-transitory recording medium storing a program for causing a computer to execute processing comprising:
collecting a voice of a customer in a store using a microphone installed in the store;
analyzing the collected voice of the customer, in order to extract a phrase related to evaluation of whether a price of a product or service at the store and that is an evaluation target is inexpensive or expensive from the collected voice of the customer;
comparing the price of the product or service at the store with a price of the product or service at another store based on the extracted phrase;
determining a new price of the evaluation target at the store upon comparison of the product or service at the store with the price of the product or service at the another store;
changing the price displayed on an electronic shelf label of the evaluation target installed in the store to the new price, based on the phrase extracted from the voice indicating whether the price of the product or service is inexpensive or expensive;
based upon the determined new price, transmitting an instruction to the electronic shelf label installed in the store to change the price displayed on the electronic shelf label, wherein the instruction controls a display of the electronic shelf label to display the new price, and controls the display of the electronic shelf label to display an indication that the price at the store has been changed to compete with the price at the another store; and
sending a notification regarding detection of price evaluation and change in the price displayed to a store clerk terminal.

* * * * *